United States Patent
Phan et al.

(10) Patent No.: US 7,265,933 B1
(45) Date of Patent: Sep. 4, 2007

(54) DISK DRIVE COMPUTING REPEATABLE RUN OUT WHILE ACTUATOR ARM IS PRESSED AGAINST CRASH STOP

(75) Inventors: Bang X. Phan, Mission Viejo, CA (US); David Dung Tien Nguyen, Fountain Valley, CA (US); Zhi Wang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/152,415

(22) Filed: Jun. 14, 2005

(51) Int. Cl.
*G11B 5/596* (2006.01)
*G11B 5/55* (2006.01)

(52) U.S. Cl. .............. 360/77.04; 360/77.06; 360/78.04

(58) Field of Classification Search ............. None
See application file for complete search history.

(56) References Cited

U.S. PATENT DOCUMENTS

| | | | |
|---|---|---|---|
| 5,550,685 A | 8/1996 | Drouin | |
| 5,585,976 A | 12/1996 | Pham | |
| 5,793,559 A | 8/1998 | Shepherd et al. | |
| 5,825,578 A | 10/1998 | Shrinkle et al. | |
| 5,920,441 A * | 7/1999 | Cunningham et al. | ... 360/78.05 |
| 6,049,440 A | 4/2000 | Shu | |
| 6,097,565 A | 8/2000 | Sri-Jayantha et al. | |
| 6,141,175 A * | 10/2000 | Nazarian et al. | ......... 360/77.04 |
| 6,310,742 B1 | 10/2001 | Nazarian et al. | |
| 6,545,835 B1 * | 4/2003 | Codilian et al. | ......... 360/77.04 |
| 6,654,198 B2 | 11/2003 | Liu et al. | |
| 6,661,599 B1 | 12/2003 | Chen et al. | |
| 6,738,205 B1 | 5/2004 | Moran et al. | |
| 6,847,503 B2 | 1/2005 | Zhang et al. | |
| 6,952,320 B1 * | 10/2005 | Pollock et al. | ........... 360/77.04 |
| 6,999,267 B1 | 2/2006 | Melkote et al. | |
| 2004/0160696 A1 * | 8/2004 | Meyer | ..................... 360/77.05 |
| 2004/0246619 A1 | 12/2004 | Zhang | |
| 2005/0231842 A1 * | 10/2005 | Pang et al. | ................... 360/31 |

\* cited by examiner

*Primary Examiner*—Andrea Wellington
*Assistant Examiner*—Jason Olson
(74) *Attorney, Agent, or Firm*—Howard H. Sheerin, Esq.

(57) ABSTRACT

A disk drive is disclosed comprising a voice coil motor (VCM) for rotating an actuator about a pivot in order to actuate a head over a disk. The disk is rotated by a spindle motor, and a feed-forward compensation value is computed that compensate for a non-centric alignment of the disk with respect to the spindle motor. During a calibration mode, the VCM is controlled to press the actuator arm against a crash stop, and the feed-forward compensation value is computed in response to a position error signal (PES). The PES is generated in response to embedded servo sectors recorded on the disk, wherein each embedded servo sector comprises a track address for coarse alignment and servo bursts for fine alignment.

18 Claims, 6 Drawing Sheets

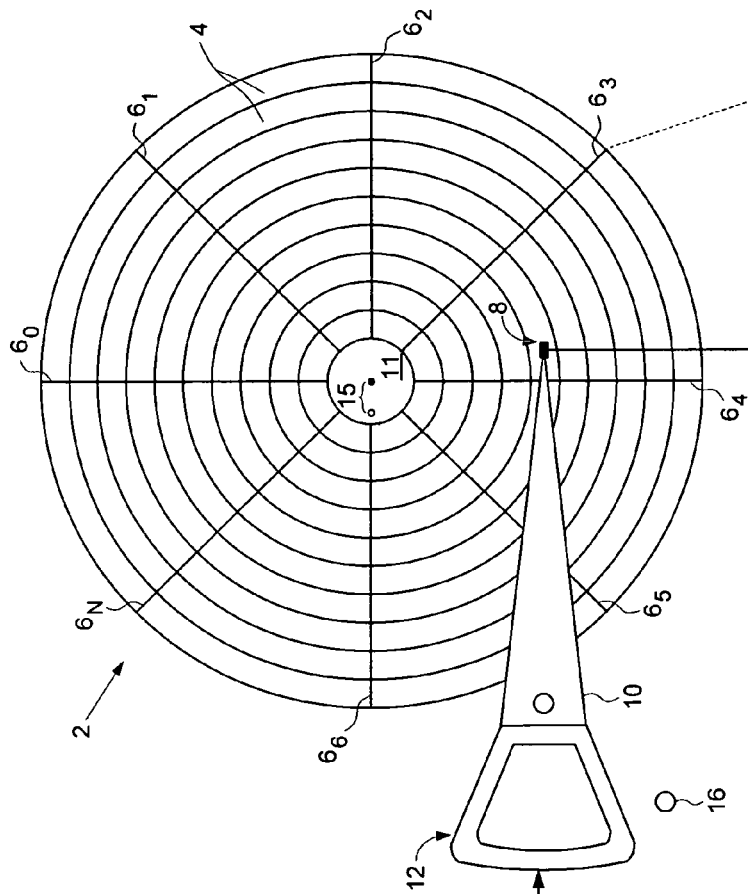
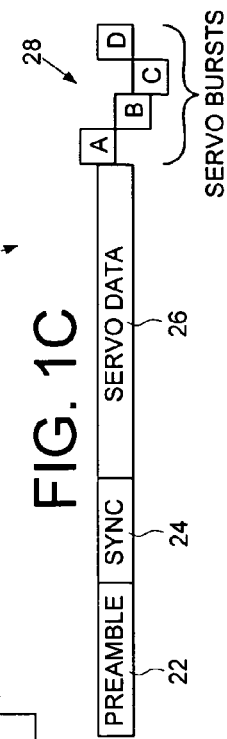
FIG. 1B
$$\begin{bmatrix} a \\ b \end{bmatrix} = (M^T \cdot M)^{-1} \cdot M^T \cdot \overrightarrow{PES}$$
FIG. 1A
FIG. 1C $$PES_1 = [\cos(2\pi k_1/N) \ \sin(2\pi k_1/N)]\begin{bmatrix}a\\b\end{bmatrix}$$

$$PES_2 = [\cos(2\pi k_2/N) \ \sin(2\pi k_2/N)]\begin{bmatrix}a\\b\end{bmatrix}$$

$$PES_3 = [\cos(2\pi k_3/N) \ \sin(2\pi k_3/N)]\begin{bmatrix}a\\b\end{bmatrix}$$

$$\vdots$$

$$PES_m = [\cos(2\pi k_m/N) \ \sin(2\pi k_m/N)]\begin{bmatrix}a\\b\end{bmatrix}$$

FIG. 3A $$\vec{PES} = M\begin{bmatrix}a\\b\end{bmatrix} \qquad \vec{PES} = [PES_1, PES_2, PES_3 \ldots PES_m]^T$$

FIG. 3B    FIG. 3C $$M = \begin{bmatrix}\cos(2\pi k_1/N) & \sin(2\pi k_1/N)\\ \cos(2\pi k_2/N) & \sin(2\pi k_2/N)\\ \cos(2\pi k_3/N) & \sin(2\pi k_3/N)\\ & \vdots\\ \cos(2\pi k_m/N) & \sin(2\pi k_m/N)\end{bmatrix}$$

FIG. 3D $$M^T \cdot \vec{PES} = M^T \cdot M \begin{bmatrix}a\\b\end{bmatrix} \implies \begin{bmatrix}a\\b\end{bmatrix} = (M^T \cdot M)^{-1} \cdot M^T \cdot \vec{PES}$$

FIG. 3E

DISK DRIVE COMPUTING REPEATABLE RUN OUT WHILE ACTUATOR ARM IS PRESSED AGAINST CRASH STOP

BACKGROUND OF THE INVENTION

1. Field of the Invention

The present invention relates to disk drives for computer systems. More particularly, the present invention relates to a disk drive computing repeatable runout (RRO) while the actuator arm is pressed against a crash stop.

2. Description of the Prior Art

Repeatable runout (RRO) in a disk drive is a disturbance in the servo system which can degrade performance by disrupting the head's centerline tracking during read and write operations. The RRO disturbance is typically caused by physical imperfections in the disk drive such as spindle motor runout, disk slippage, disk warping, media defects, and imperfections in the electromechanical servoing mechanism including the mechanism for writing embedded servo sectors onto the disk during manufacturing. Because the imperfections that cause RRO are relatively static, RRO is a predictable disturbance that is periodic with the rotation of the disk. It is known in the industry to estimate and cancel out the periodic RRO disturbance by introducing a feed-forward compensation signal into the servo loop.

The RRO disturbance due to the disk having a non-centric alignment with the spindle motor is sinusoidal with a period equal to the rotation of the disk. This sinusoidal disturbance can be represented as:

$$a^*\cos(2\pi k/N) + b^*\sin(2\pi k/N)$$

where $\{a,b\}$ are coefficients corresponding to the magnitude of the disturbance (magnitude of the non-centric offset) and k is an index representing one of N servo sectors.

Prior art techniques typically estimate the composite RRO disturbance due to all sources of eccentricity, such as eccentricities of the servo sectors (written-in RRO), spindle motor runout, disk warping, as well as the RRO disturbance due to the disk's non-centric alignment with the spindle motor. The prior art techniques for estimating the composite RRO disturbance typically involves processing the position error signal (PES) over many revolutions of the disk in order to average out other noise sources (the non-repeatable runout). The composite RRO disturbance is typically estimated during a manufacturing process, and may be updated every time the disk drive is powered on to account for changes that occur over time, particularly disk slippage due to external physical shocks. However, estimating the composite RRO disturbance at every power-on is undesirable in portable applications since it consumes a significant amount of power due to the numerous revolutions. In addition, estimating the composite RRO disturbance over multiple revolutions precludes updating the RRO estimate during normal operation of the disk drive, for example, if the disk drive is subjected to a physical shock causing disk slippage while transferring data to the host. This can lead to an undesirable pause in streaming applications, such as in portable music players, while the disk drive re-estimates the composite RRO disturbance.

There is, therefore, a need for a fast, power-efficient technique for estimating the RRO disturbance when a disk drive is subjected to a physical shock causing disk slippage.

SUMMARY OF THE INVENTION

The present invention may be regarded as a disk drive comprising a disk having a plurality of data tracks, wherein each data track comprises a plurality of data sectors and a plurality of embedded servo sectors. A head is coupled to the distal end of an actuator arm, and a voice coil motor (VCM) rotates the actuator arm about a pivot to actuate the head over the disk. A spindle motor rotates the disk, and control circuitry generates a control signal applied to the VCM in response to a position error signal (PES) generated from reading the embedded servo sectors and a first feed-forward compensation value that compensates for a repeatable runout (RRO) due to a non-centric alignment of the disk with respect to the spindle motor. The control circuitry computes the first feed-forward compensation value by controlling the VCM to press the actuator arm against a crash stop, and computing the first feed-forward compensation value in response to the PES.

In one embodiment, the PES is generated from a track address recorded in the embedded servo sectors, and in another embodiment the PES is generated in response to a plurality of servo bursts recorded in the embedded servo sectors.

In yet another embodiment, the control circuitry computes the first feed-forward compensation value from coefficients $\{a,b\}$ of a sinusoid:

$$a^*\cos(2\pi k/N) + b^*\sin(2\pi k/N)$$

wherein k is an index representing one of N servo sectors. In one embodiment, the control circuitry computes the coefficients $\{a,b\}$ according to:

$$\begin{bmatrix} a \\ b \end{bmatrix} = (M^T * M)^{-1} * M^T * \overrightarrow{PES}$$

wherein:

$$\overrightarrow{PES} = [PES_1, PES_2, PES_3 \ldots PES_m]^T,$$

$$\text{and } M = \begin{bmatrix} \cos(2\pi k_1/N) & \sin(2\pi k_1/N) \\ \cos(2\pi k_2/N) & \sin(2\pi k_2/N) \\ \cos(2\pi k_3/N) & \sin(2\pi k_3/N) \\ M \\ \cos(2\pi k_m/N) & \sin(2\pi k_m/N) \end{bmatrix}$$

In still another embodiment, the control circuitry computes the first feed-forward compensation value when the disk drive is powered on, and in another embodiment, the control circuitry computes the first feed-forward compensation value if the PES exceeds a predetermined threshold, or when the average PES exceeds a predetermined threshold.

In another embodiment, the disk drive receives a command from a host to enable the control circuitry to compute the first feed-forward compensation value.

In yet another embodiment, the control circuitry for generating the control signal applied to the VCM in response to a second feed-forward compensation value that compensates for additional RRO, including RRO due to errors in writing the embedded servo sectors to the disk.

The present invention may also be regarded as a method of operating a disk drive, the disk drive comprising a disk having a plurality of data tracks, wherein each data track comprises a plurality of data sectors and a plurality of embedded servo sectors. A head is coupled to the distal end of an actuator arm, and a voice coil motor (VCM) rotates the actuator arm about a pivot to actuate the head over the disk. A spindle motor rotates the disk, wherein the disk has a non-centric alignment with the spindle motor resulting in a repeatable runout (RRO). The method comprises the steps of controlling the VCM to press the actuator arm against a crash stop and computing a first feed-forward compensation value in response to a position error signal (PES) generated from reading the embedded servo sectors, wherein the first feed-forward compensation value compensates for the RRO. A control signal is then applied to the VCM in response to the PES and the first feed-forward compensation value.

BRIEF DESCRIPTION OF THE DRAWINGS

FIG. 1A shows a disk drive according to an embodiment of the present invention comprising control circuitry for computing a RRO feed-forward compensation value that compensates for non-centric disk alignment by pressing the actuator arm against a crash stop and evaluating the resulting PES.

FIG. 1B shows an equation according to an embodiment of the present invention for computing coefficients used to generate the RRO feed-forward compensation value.

FIG. 1C shows the format of an embedded servo sector according to an embodiment of the present invention comprising servo data (e.g., a track address) and servo bursts.

FIGS. 3A–3E illustrate the derivation of the coefficients in the equation of FIG. 1B.

DESCRIPTION OF THE PREFERRED EMBODIMENTS

Figure 2A:
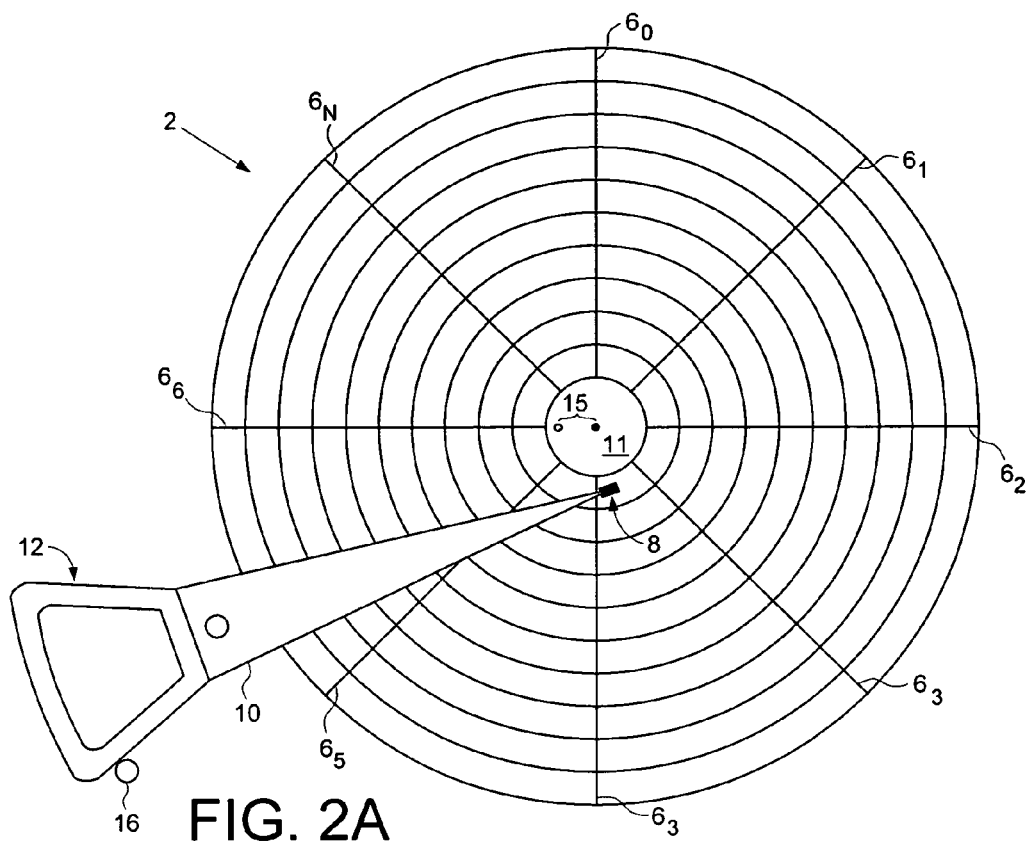
FIGS. 2A–2B illustrate the change in the PES due to the non-centric alignment of the disk when the actuator arm is pressed against the crash stop and the disk is rotated.

FIG. 1A shows a disk drive according to an embodiment of the present invention comprising a disk 2 having a plurality of data tracks 4, wherein each data track comprises a plurality of data sectors and a plurality of embedded servo sectors $6_0$–$6_N$. A head 8 is coupled to the distal end of an actuator arm 10, and a voice coil motor or VCM (having a voice coil 12) rotates the actuator arm 10 about a pivot to actuate the head 8 over the disk 2. A spindle motor (having a shaft 11) rotates the disk 2, and control circuitry generates a control signal applied to the VCM in response to a position error signal (PES) generated from reading the embedded servo sectors $6_0$–$6_N$ and a first feed-forward compensation value 14 that compensates for a repeatable runout (RRO) due to a non-centric alignment 15 of the disk 2 with respect to the spindle motor. The control circuitry computes the first feed-forward compensation value 14 by controlling the VCM to press the actuator arm 10 against a crash stop 16, and computing the first feed-forward compensation value 14 in response to the PES.

The control circuitry in the embodiment of FIG. 1A includes a read channel 18 for demodulating the read signal 20 emanating from the head 8, including to demodulate the data in the embedded servo sectors $6_0$–$6_N$. FIG. 1C shows an example format of an embedded servo sector $6_3$ comprising a preamble 22, a sync mark 24, servo data 26, and servo bursts 28. The preamble 22 synchronizes timing recovery and gain control within the read channel 18, and the sync mark 24 bit synchronizes the servo data 26. The servo data 26 comprises a track address for generating a coarse position for the head 8, and the servo bursts 28 comprises groups of high frequency transitions recorded at precise offsets for generating a fine position of the head 8 with respect to the centerline of the target track. The read channel 18 demodulates the servo data 26 (track address) and servo bursts 28 which are provided to PES circuitry 30 which calculates the PES as a difference between the current radial location of the head 8 and a target location. The PES is processed by a servo compensator 32 to generate a control signal 34 added to the first feed-forwarded compensation value 14 to generate a VCM control signal 36 applied to the voice coil 12. In an alternative embodiment, the first feed-forward compensation value 14 is used to modify the PES input into the servo compensator 32 rather than modify the output of the servo compensator 32.

Figure 2B:
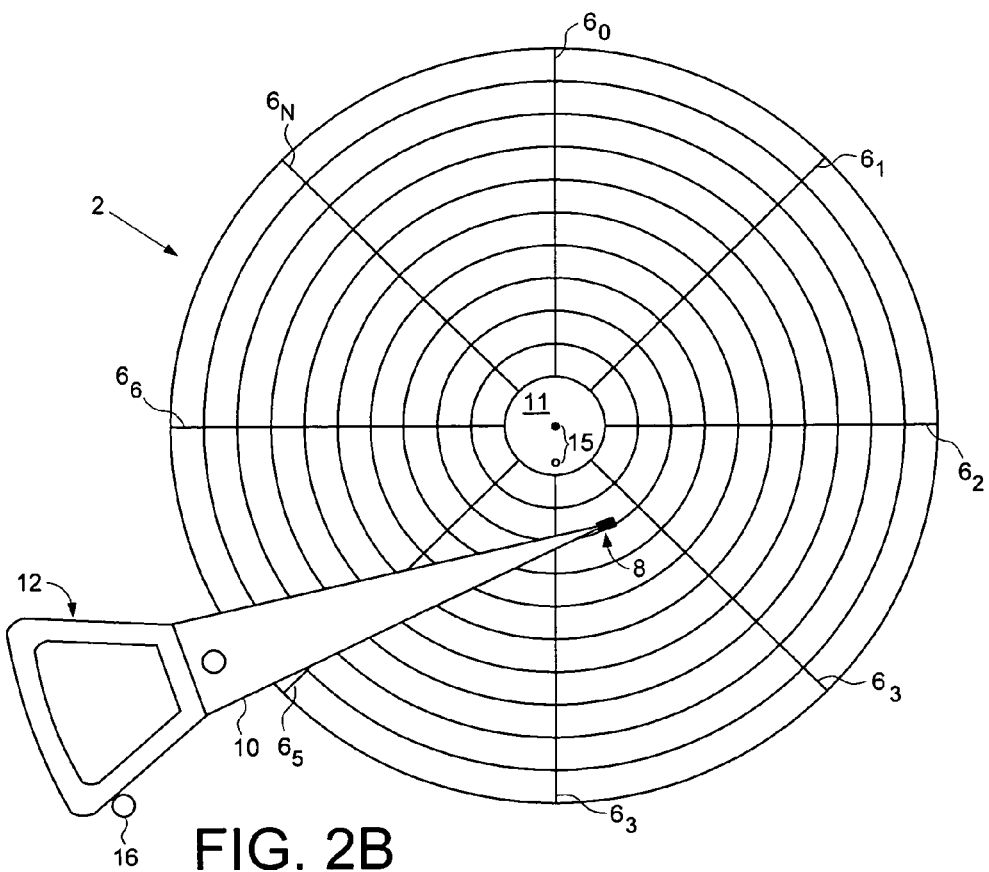

FIGS. 2A–2B illustrate the change in the PES due to the non-centric alignment of the disk 2 when the actuator arm 10 is pressed against the crash stop 16. The offset 15 between the center of the disk 2 and the center of the spindle motor shaft 11 causes the head 8 to move radially with respect to the disk 2 as it rotates. This is illustrated in FIG. 2B wherein the disk has been rotated 90 degrees relative to FIG. 2A with a corresponding movement of the head 8 relative to the disk 2. Depending on the extent of the non-centric disk alignment, the head 8 may traverse multiple tracks over a revolution of the disk 2 as indicated by a change in track address component of the PES, or the head 8 may oscillate within a single track as indicated by the servo bursts component of the PES.

In the embodiment of FIG. 1A, the control circuitry comprises a coefficient calculator 38 for calculating coefficients $\{a,b\}$ of a sinusoid representing the RRO disturbance:

$$a*\cos(2\pi k/N) + b*\sin(2\pi k/N)$$

wherein k is an index representing one of the N servo sectors $6_0$–$6_N$. When the actuator arm 10 is pressed against the crash stop 16, the RRO disturbance due to the non-centric disk alignment is the dominant factor in the PES. This is illustrated in FIG. 3A which shows the $PES_k$ at each servo sector k represented as the above sinusoid. FIG. 3A can be re-written as shown in FIG. 3B as the PES vector (transposed FIG. 3C) equal to the matrix of FIG. 3D multiplied by the matrix of the coefficients $\{a,b\}$. Multiplying both sides of FIG. 3B by $M^T$ leads to the estimate for the coefficients $\{a,b\}$ shown in FIG. 3E. The component $(M^T \cdot M)^{-1} \cdot M^T$ of the equation shown in FIG. 3E can be pre-computed and stored in each disk drive during manufacturing. The coefficients $\{a,b\}$ are then computed by multiplying the stored component $(M^T \cdot M)^{-1} M^T$ by the PES vector measured while the actuator arm 10 is pressed against the crash stop 16. In one embodiment, the PES vector is generated by averaging a predetermined number of disk revolutions in order to average out non-RRO contributions to the PES measurement. In another embodiment, only a subset of the embedded servo sectors $6_0$–$6_N$ (e.g., every other servo sector) is used to generate the PES vector for computing the coefficients {a,b}. That is, the PES vector $PES_1$–$PES_m$ in FIG. 3A may correspond to non-consecutive servo sectors in order to reduce the sampling rate while computing the coefficients {a,b}.

Figure 4:
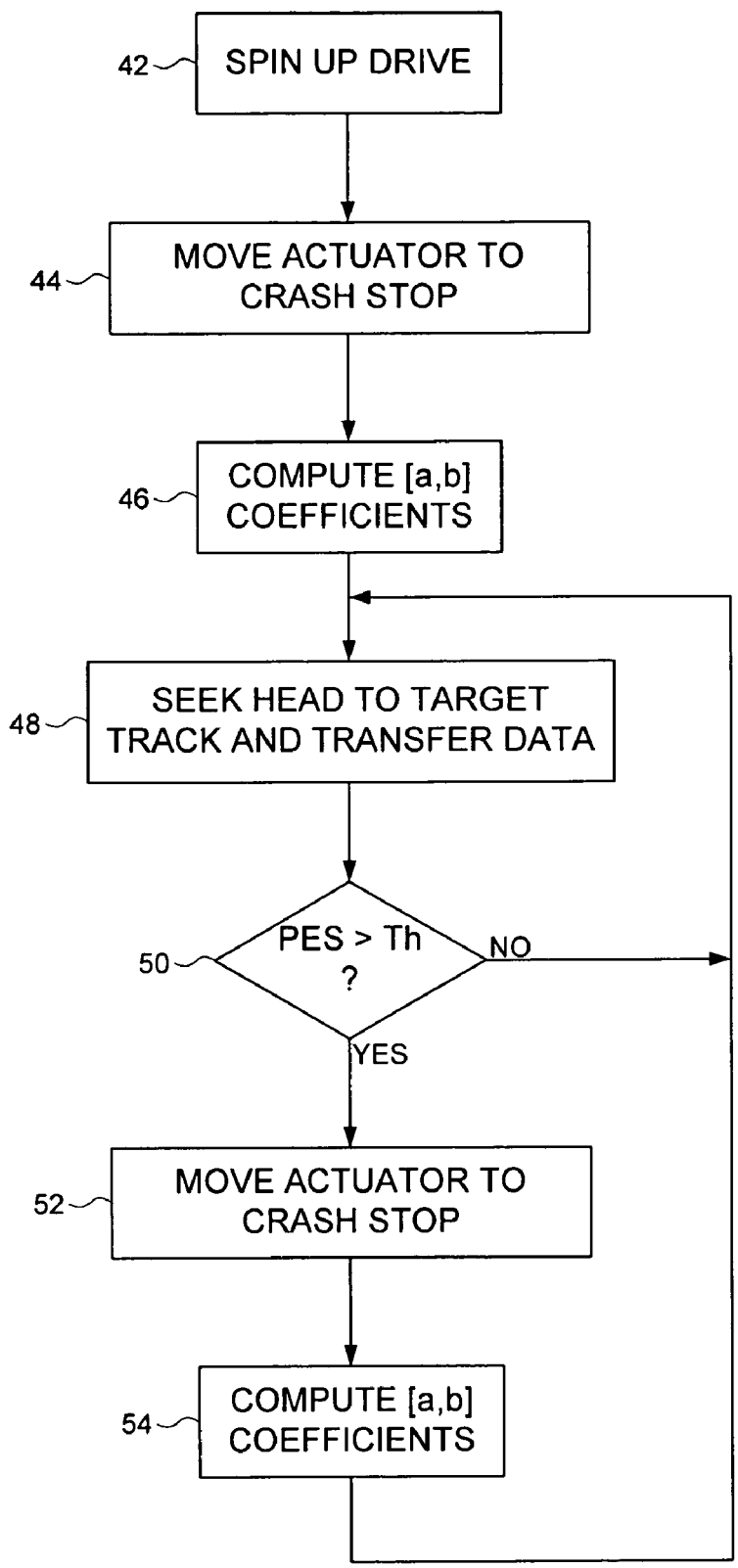
FIG. 4 is a flow diagram according to an embodiment of the present invention wherein the coefficients for generating the RRO feed-forward compensation value are re-computed if the average PES exceeds a predetermined threshold while accessing a target track during a read or write operation.

In one embodiment, the first feed-forward compensation value 14 is estimated (e.g., by computing the coefficients {a,b}) periodically, for example, every time the disk drive is powered on. In another embodiment, the first feed-forward compensation value 14 is estimated when the PES (or average PES) exceeds a predetermined threshold indicating that the error in the first feed-forward compensation value has exceeded a threshold, for example, due to the disk slipping after a physical shock to the disk drive. This embodiment is illustrated in the flow diagram of FIG. 4 wherein at step 42 the disk is spun up (e.g., after a power on), at step 44 the actuator arm 10 is moved to the crash stop 16, and at step 46 the coefficients {a,b} are computed in response to the PES using the equation of FIG. 3E. At step 48 the control circuitry seeks the head to a target data track in response to a read/write command received from the host and begins transferring data (read or write). If while executing the host command at step 50 the average PES exceeds a predetermined threshold (indicating a possible disk-slip event), then at step 52 the control circuitry moves the actuator arm 10 to the crash stop 16 and at step 54 re-computes the coefficients {a,b} in response to the PES.

Figure 5:
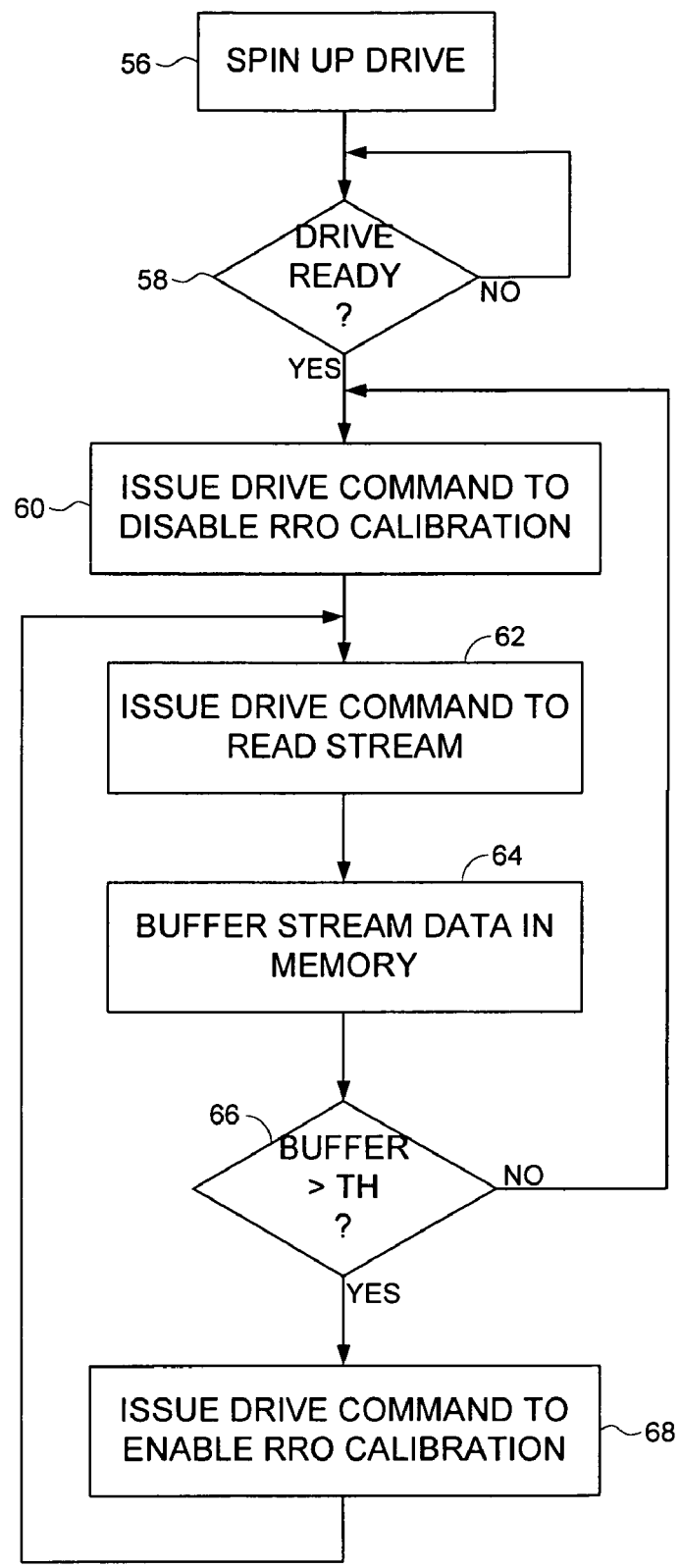
FIG. 5 is a flow diagram according to an embodiment of the present invention wherein a host computer enables the disk drive to perform the RRO calibration once enough stream data has been buffered by the host.

In an embodiment shown in the flow diagram of FIG. 5, the disk drive receives a command from a host to enable the RRO calibration process while transferring a stream of data from the disk drive. For example, a portable audio player may enable an integrated disk drive to perform the RRO calibration after enough audio data has been buffered on the host side to allow the calibration to occur without interrupting the audio stream played to the end user. At step 56 the host issues a command to spin up the disk drive and at step 58 waits until the disk drive is ready. At step 60 the host issues a command to disable the RRO calibration to prevent the disk drive from performing the RRO calibration while transferring a data stream to the host. At step 62 the host issues a command to read a data stream from the disk drive (e.g., an audio stream) and at step 64 the host buffers the stream data in a semiconductor memory. Once the host has buffered enough stream data at step 66, the host issues a command to the disk drive at step 68 to enable the RRO calibration. If the RRO calibration has been enabled at step 68 and the buffered data falls below the threshold at step 66, the host re-issues the command at step 60 to disable the RRO calibration until enough stream data is again buffered at step 66.

Figure 6:
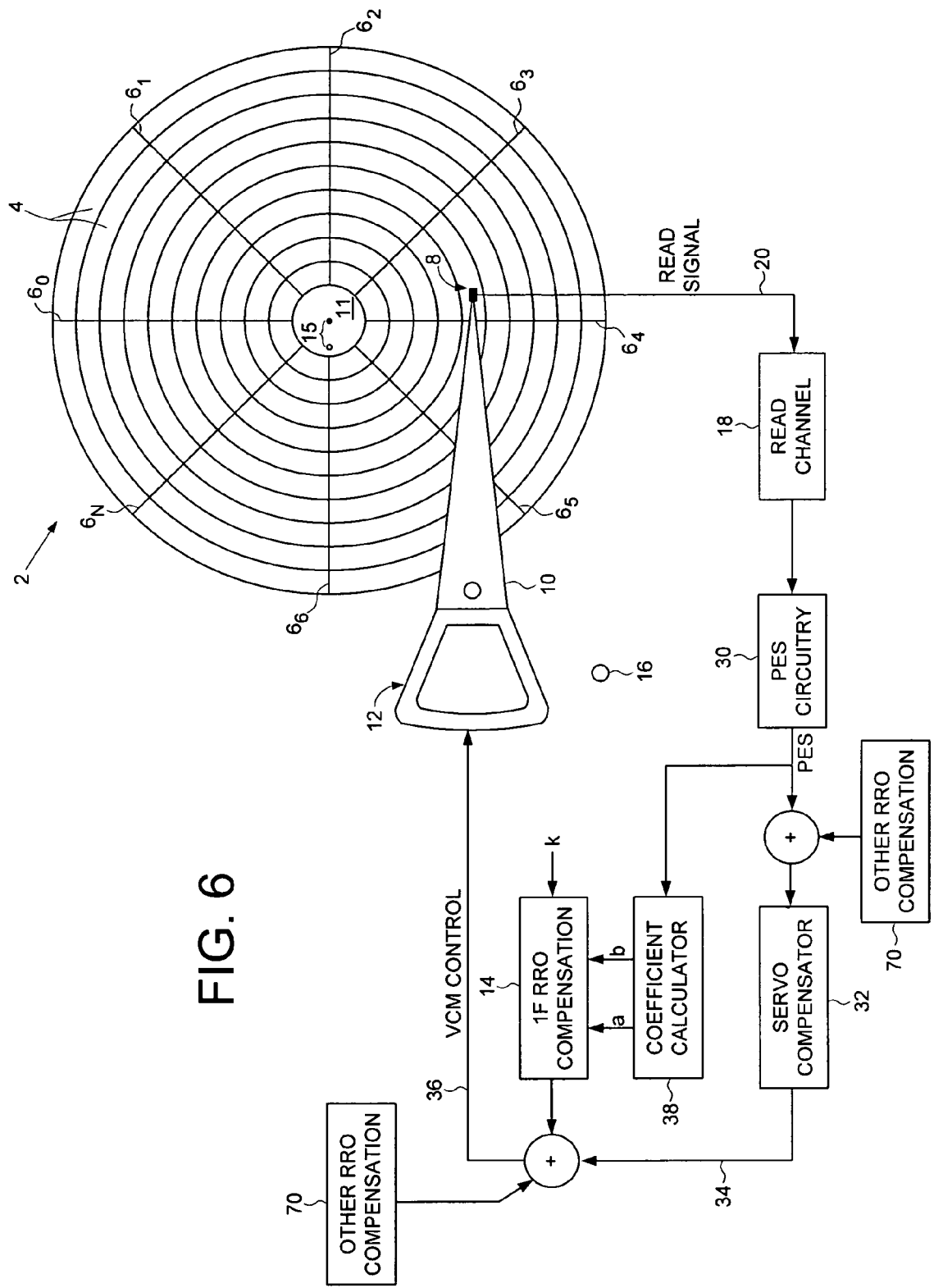
FIG. 6 shows a disk drive according to an embodiment of the present invention wherein the VCM control signal is generated in response to an additional RRO feed-forward compensation value which compensates for other eccentricities.

FIG. 6 shows an embodiment of the present invention wherein the first feed-forward compensation value 14 that compensates for non-centric disk alignment (referred to as 1F RRO) is combined with a second feed-forward compensation value 70 that compensates for additional RRO, including RRO due to errors in writing the embedded servo sectors $6_0$–$6_N$ to the disk 2. In one embodiment, the second feed-forward compensation values 70 are computed during a manufacturing process for each data track 4 by evaluating the PES generated while servoing the head 8 over each data track. Any suitable algorithm may be employed to estimate the second feed-forward compensation value, including to average the PES over many revolutions of the disk in order to average out other noise sources (the non-repeatable runout), and then backing out the effect of the servo compensator 32. As shown in the embodiment of FIG. 6, the second feed-forward compensation value 70 may adjust the output of the servo compensator 32 and/or adjust the PES at the input of the servo compensator 32.

We claim:

1. A disk drive comprising:
   (a) a disk comprising a plurality of data tracks, wherein each data track comprises a plurality of data sectors and a plurality of embedded servo sectors;
   (b) an actuator arm;
   (c) a head coupled to a distal end of the actuator arm;
   (d) a voice coil motor (VCM) for rotating the actuator arm about a pivot in order to actuate the head over the disk;
   (e) a crash stop;
   (f) a spin die motor for rotating the disk; and
   (g) control circuitry for generating a control signal applied to the VCM in response to a position error signal (PES) generated from reading the embedded servo sectors and a first feed-forward compensation value that compensates for a repeatable runout (RRO) due to a non-centric alignment of the disk with respect to the spindle motor, wherein the control circuitry computes the first feed-forward compensation value if the PES exceeds a predetermined threshold and the control circuitry computes the first feed-forward compensation value by:
   controlling the VCM to press the actuator arm against the crash stop; and
   computing the first feed-forward compensation value in response to the PES.

2. The disk drive as recited in claim 1, wherein the PES is generated from a track address recorded in the embedded servo sectors.

3. The disk drive as recited in claim 1, wherein the PES is generated from a plurality of servo bursts recorded in the embedded servo sectors.

4. The disk drive as recited in claim 1, wherein the control circuitry for computing the first feed-forward compensation value from coefficients {a,b} of a sinusoid;

$$a*\cos(2\pi k/N) + b*\sin(2\pi k/N)$$

wherein k is an index representing one of N servo sectors.

5. The disk drive as recited in claim 4, wherein the control circuitry for computing the coefficients {a,b} according to:

$$\begin{bmatrix} a \\ b \end{bmatrix} = (M^T * M)^{-1} * M^T * \overrightarrow{PES}$$

wherein:

$$\overrightarrow{PES} = [PES_1, PES_2, PES_3 \ldots PES_m]^T,$$

$$\text{and } M = \begin{bmatrix} \cos(2\pi k_1/N) & \sin(2\pi k_1/N) \\ \cos(2\pi k_2/N) & \sin(2\pi k_2/N) \\ \cos(2\pi k_3/N) & \sin(2\pi k_3/N) \\ \vdots & \\ \cos(2\pi k_m/N) & \sin(2\pi k_m/N) \end{bmatrix}.$$

6. The disk drive as recited in claim 1, wherein the control circuitry computes the first feed-forward compensation value when the disk drive is powered on.

7. The disk drive as recited in claim 1, wherein the control circuitry determines that the PES exceeds the predetermined threshold if the average PES exceeds a predetermined threshold.

8. The disk drive as recited in claim 1, wherein the disk drive receives a command from a host to enable the control circuitry to compute the first feed-forward compensation value.

9. The disk drive as recited in claim 1, wherein the control circuitry for generating the control signal applied to the VCM in response to a second feed-forward compensation value that compensates for additional RRO, including RRO due to errors in writing the embedded servo sectors to the disk.

10. A method of operating a disk drive, the disk drive comprising a disk comprising a plurality of data tracks, wherein each data track comprises a plurality of data sectors and a plurality of embedded servo sectors, an actuator arm, a head coupled to a distal end of the actuator arm, a voice coil motor (VCM) for rotating the actuator arm about a pivot in order to actuate the head over the disk, a crash stop, and a spindle motor for rotating the disk, the method comprising the steps of:
  (a) determining whether a position error signal (PES) generated from reading the embedded servo sectors exceeds a predetermined threshold
  (b) if the PES exceeds the predetermined threshold, controlling the VCM to press the actuator arm against the crash stop and computing a first feed-forward compensation value in response to the PES generated from reading the embedded servo sectors with the actuator arm against the crash stop, wherein the first feed-forward compensation value compensates for a repeatable runout (RRO) due to a non-centric alignment of the disk with respect to the spindle motor; and
  generating a control signal applied to the VCM in response to the PES and the first feed-forward compensation value.

11. The method as recited in claim 10, wherein the PES is generated from a track address recorded in the embedded servo sectors.

12. The method as recited in claim 10, wherein the PES is generated from a plurality of servo bursts recorded in the embedded servo sectors.

13. The method as recited in claim 10, wherein the first feed-forward compensation value is computed from coefficients $\{a,b\}$ of a sinusoid:

$$a^*\cos(2\pi k/N) + b^*\sin(2\pi k/N)$$

wherein k is an index representing one of N servo sectors.

14. The method as recited in claim 13, wherein the coefficients $\{a,b\}$ are computed according to:

$$\begin{bmatrix} a \\ b \end{bmatrix} = (M^T * M)^{-1} * M^T * \vec{PES}$$

wherein:

$$\vec{PES} = [PES_1, PES_2, PES_3 \ldots PES_m]^T,$$

$$\text{and } M = \begin{bmatrix} \cos(2\pi k_1/N) & \sin(2\pi k_1/N) \\ \cos(2\pi k_2/N) & \sin(2\pi k_2/N) \\ \cos(2\pi k_3/N) & \sin(2\pi k_3/N) \\ \vdots & \\ \cos(2\pi k_m/N) & \sin(2\pi k_m/N) \end{bmatrix}.$$

15. The method as recited in claim 10, wherein the actuator arm is pressed against the crash stop and the first feed-forward compensation value computed when the disk drive is powered on.

16. The method as recited in claim 10, wherein the step of determining whether the PES exceeds a predetermined threshold comprises determining whether the average PES exceeds a predetermined threshold.

17. The method as recited in claim 10, further comprising the step of receiving a command from a host to enable the step of pressing the actuator arm against the crash stop and computing the first feed-forward compensation value.

18. The method as recited in claim 10, wherein the control signal applied to the VCM is further computed in response to a second feed-forward compensation value that compensates for additional RRO, including RRO due to errors in writing the embedded servo sectors to the disk.

* * * * *